H. C. PATTERSON.
Steam-Cooker.
No. 222,838.     Patented Dec. 23, 1879.
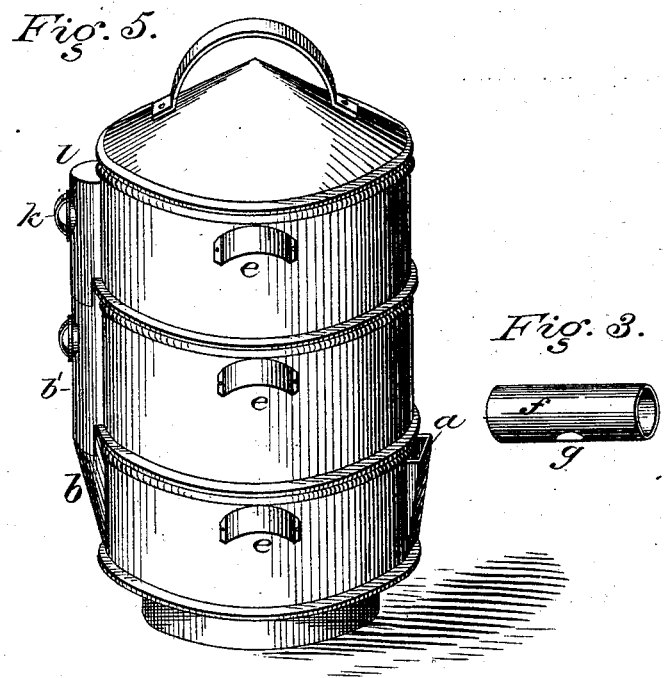

UNITED STATES PATENT OFFICE.

HENRY C. PATTERSON, OF LAWRENCE, KANSAS.

IMPROVEMENT IN STEAM-COOKERS.

Specification forming part of Letters Patent No. 222,838, dated December 23, 1879; application filed October 17, 1879.

*To all whom it may concern:*

Be it known that I, HENRY C. PATTERSON, of Lawrence, in the county of Douglas, and in the State of Kansas, have invented certain new and useful Improvements in Steam-Cookers; and I do hereby declare that the following is a full, clear, and exact description thereof, reference being had to the accompanying drawings, and to the letters of reference marked thereon, making a part of this specification.

The nature of my invention consists in the construction and arrangement of a steam-cooker, as will be hereinafter more fully set forth.

In order to enable others skilled in the art to which my invention appertains to make and use the same, I will now proceed to describe its construction and operation, referring to the annexed drawings, in which—

Figure 1 is a vertical section of the lower section of my cooker, and Fig. 2 is a similar view of an upper section. Figs. 3 and 4 are detail views of the valve. Fig. 5 is a perspective of the cooker complete.

My cooker is composed of a number of sections, which are placed one on top of the other in the usual manner, the lower one of which sections, A, is provided with a spout, $a$, on one side, into which the water is poured. A hole, $c$, is made in the side of the section at the lower end of the spout, so that the water can pass from the spout into the section. Upon the opposite side of section A from the spout is formed the tube $b$, and through the top of the section is made the hole $d$, through which the steam escapes into the tube $b'$ above, and which tube $b'$ extends up along the sides of all the other sections in the usual manner, and is provided with a cover, $l$, at its top. Each section of the cooker is provided with the usual handles $e$.

Extending from each section of the cooker, with the exception of the lower one, is a tube, $f$, which has a hole, $g$, through one side, through which hole the steam passes into the section to cook the food placed therein.

In order to turn the steam off or on from any one section, as may be desired, a valve, $j$, is placed in the tube $f$, as shown. This valve is provided with a handle, $k$, on its outer end, so that it can be readily turned to let on or shut off the steam, and has one side, $h$, made long enough to extend past the hole $g$. When this valve is turned as shown in Fig. 2, it shuts off the steam from that particular section, so as to stop the cooking of any article placed therein.

The great advantage of my invention is, that the valves extend to the outside of my cooker, so that each one can be operated independently of the others, and without having to displace any part of the cooker.

Having thus described my invention, I claim—

In combination with the sections of a steam-cooker, the tube $b'$, the tube $f$, having a hole, $g$, and the valve $j$, having a handle projecting outside of the tube $b'$, substantially as shown.

In testimony that I claim the foregoing I have hereunto set my hand this 25th day of June, 1879.

HENRY C. PATTERSON.

Witnesses:
EDWARD B. MILLER,
PAUL W. ROTE.